United States Patent
Kamikawa

[11] 3,974,977
[45] Aug. 17, 1976

[54] FISHING REEL
[75] Inventor: Kiyohide Kamikawa, Sakai, Japan
[73] Assignee: Shimano Industrial Company, Limited, Osaka, Japan
[22] Filed: May 28, 1974
[21] Appl. No.: 473,830

[52] U.S. Cl. ............................................. 242/84.1 R
[51] Int. Cl.² ........................................... A01K 89/00
[58] Field of Search ................. 242/84.1 R, 84.1 F, 242/84.2 R, 84.21 R, 84.5 R, 84.51 R, 211, 212, 213, 214, 215, 216, 217, 218, 219, 200, 227

[56] References Cited
UNITED STATES PATENTS

| | | | |
|---|---|---|---|
| 1,508,078 | 9/1924 | Timko | 242/84.51 R |
| 2,298,481 | 10/1942 | Hayes | 242/84.5 R X |
| 2,478,111 | 8/1949 | Kilian | 242/84.5 R X |
| 2,859,924 | 11/1958 | Sarah | 242/84.51 R X |

Primary Examiner—Billy S. Taylor
Attorney, Agent, or Firm—Stevens, Davis, Miller & Mosher

[57] ABSTRACT

A fishing reel having a spool rotatably supported at both ends thereof with two side plates opposite each other so that a fishing line is wound up onto the spool by means of rotation thereof, wherein an annular notched portion is formed at the inside of the outer periphery of flanges at both ends of the spool and the inner surface of a hole perforated through a cover plate which is secured to each of the side plates is permitted to face the notched portion, thereby to prevent the line from entering into a gap between a side plate and the spool because of its getting over the flange of the spool.

2 Claims, 5 Drawing Figures

FISHING REEL

This invention relats to a fishing reel which is adapted to rotate a spool for winding up a fishing line thereon and more particularly to a fishing reel provided with a spool of which a spool shaft is rotatably supported at both ends thereof with two side plates opposite to each other whereby the reel is turned with a handle for winding up the line onto the spool.

conventionally, a reel of this kind is constituted of a spool which is accomodated between two opposite side plates to be rotatable for winding up a fishing line, therefore the fishing line which has been wound up onto the spool, occasionally gets over the outer peripheral edge of the flange of the spool and enters into the gap between the inner surface of the side plate and the outer surface of the flange. Then the line happens to coil the spool shaft resulting in being cut or to cause the spool to be unrotatable.

Particularly, in a case that a fishing reel is provided with a gear-housing which is formed in a box like shape by inwardly bending the periphral end of the side plate and has a drag mechanism therein, or is provided with a gear-housing which has therein a transmitting mechanism having a driving shaft with a handle for transmitting the driving force to the spool shaft from the driving shaft, a line may also twine gears of the mechanism to make the above-mentioned construction more defective.

A conventional fishing reel is designed to have a gap as narrow as possible between the inner surface of the edge of the side plate and the outer surface of the periphery of flange, however, the gap is limited in construction to make it smaller in dimension than is predetermined. Consequently, a fishing line occasionally enters into the gap.

The present invention has been directed to eliminate the abovementioned defect. It is a main object of the invention to provide a fishing reel making it possible to exactly prevent a fishing line from entering into a gap between an inner surface of a side plate and a lateral surface of a spool. It is another object of the invention to provide a fishing reel capable of preventing a fishing line from entering into the gap and also easy to be manufactured and low in cost. These objects and effects of this invention will become more apparent in the detailed description which follows and the accompanying drawings, in which;

Figure 1:
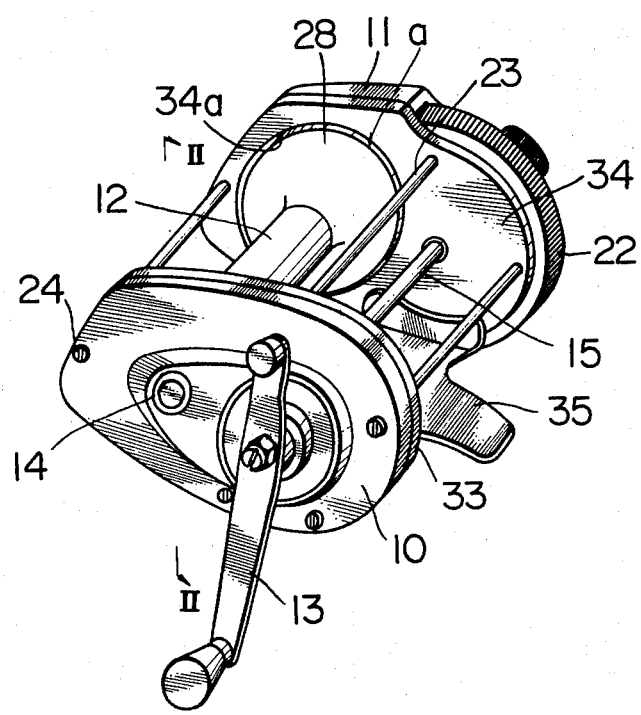
FIG. 1 is a perspective view of a fishing reel of the invention.
Figure 5:
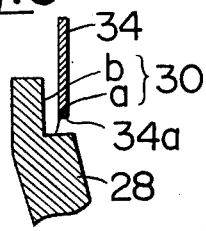

FIG. 5 is a partially enlarged sectional view of a principal part of the reel in FIG. 1. With reference to FIG. 1, a fishing reel in accordance with the present invention comprises two side plates 10, 11 opposite to each other and a spool 12 being accommodated between these two side plates 10, 11 to be rotated by means of a turn of a handle 13 attached thereto.

The side plates 10, 11 are made of synthetic resin or the like and have the outer peripheral end portion inwardly bent to become approximately box-shaped. One side plate 10 of the two side plates 10, 11 is provided at the center thereof with a brass bearing 14 and a fixed driving gear 16 is mounted to a driving shaft 15 which is rotated with the handle 13, and the other side plate 11 is provided at the center thereof with an adjusting knob 17 serving a brass bearing for supporting a spool shaft as described hereinafter. Furthermore, within the fishing reel there is provided a drag mechanism comprising, not shown in detail, a fixed gear 18 engageable and disengageable with the driving shaft 15, a reversion-proof pawl 19, a free pawl 20, a pawl-control plate 21 and an operating ring 22 fixed thereto; thus a gear-housing is provided in the fishing reel. The abovementioned drag mechanism is well known and is not explained herewith. Additionally, these side plates 10, 11 are fixedly connected to each other at a regularly spaced interval therebetween with a plurality of connecting rods 23 of a predetermined equal length. In this instance, a well known method is available for fixing the side plates, and the connecting rods 23 are as shown in the drawings provided at each end thereof with a threaded hole which is screwed with a screw bolt 24 from the outside of side plates 10, 11 respectively.

Figure 2:
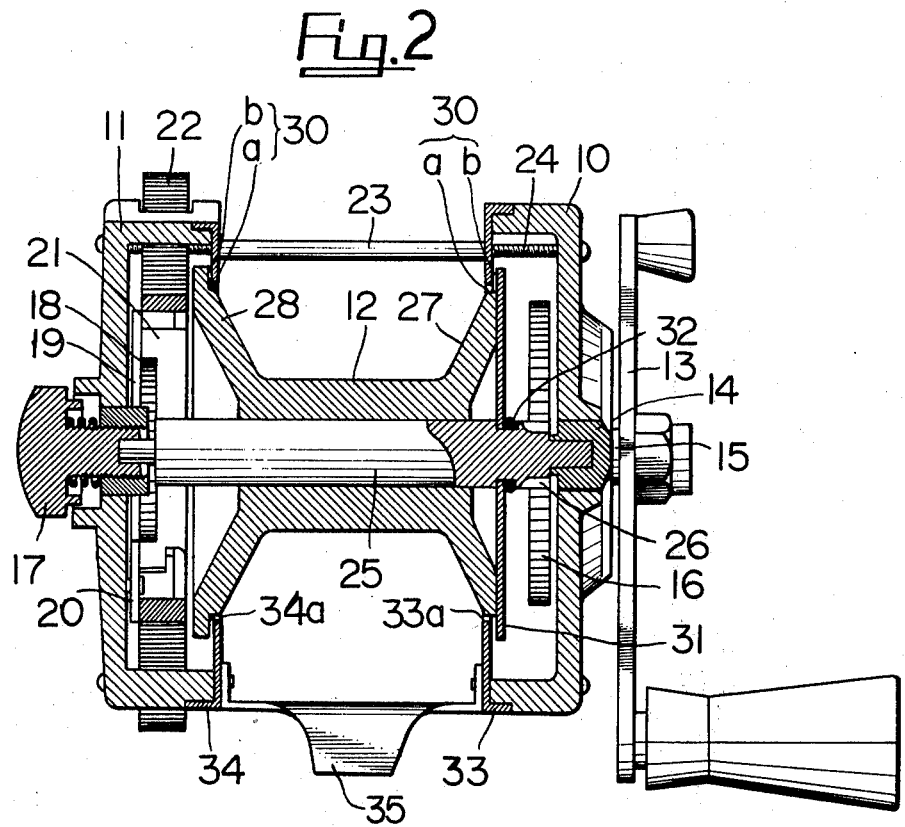
FIG. 2 is a sectional view thereof taken on Line II—II in FIG. 1.
Figure 3:
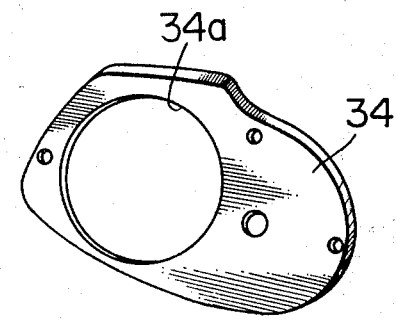
FIG. 3 is a perspective view of a cover plate of the reel in FIG. 2.
Figure 4:
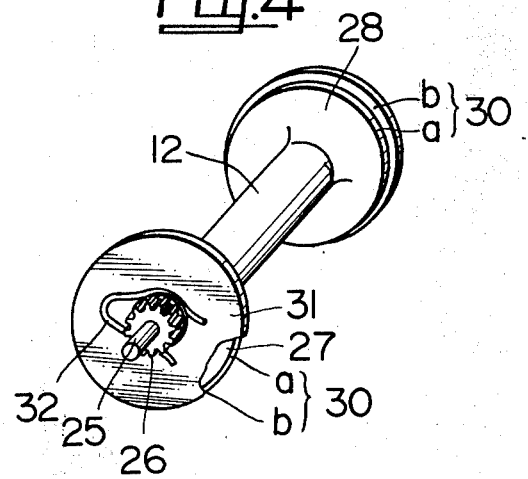
FIG. 4 is a persepctive view of a spool thereof.

Referring to FIG. 2, the reference numeral 25 denotes a spool shaft rotatably supported at both ends thereof with the brass bearing 14 and the adjusting knob 17 which are mounted to the abovementioned two side plates 11, 12 respectively. The spool shaft 25 fixedly supports the spool 12 at the substantially intermediate portion of the shaft and also has a subordinate gear 26 which is located at the end portion of the spool shaft at the plate 10 side and is always engaged with the driving gear 16 rigidly fixed to the driving shaft 15. Thus, rotation of the handle 13 is transmitted to the driving shaft 15, the driving gear 16, the subordinate gear 26 and the spool shaft 25 so that the spool may be rotated.

The spool 12 has disc-like shaped flanges 27, 28 formed at both ends thereof. These flanges are provided with annular notched portion 30 internally of the outer periphery thereof respectively, which notched portion 30 are formed of an axial face $a$ and a radial face $b$ with respect to the spool shafts, respectively. As is shown in FIG. 2, a notched portion 30 at one flange 28 is formed by cutting the inner portion of the outer periphery of the flange, while a notched portion 30 at the other flange 27 has the abovementioned radial face $b$ formed of the periphery of a disc plate 31 which is fixed to the spool shaft in contact with the outer lateral surface of the annular edge of the flange 27 by means of a fixing means such as a retaining ring 32.

The reference numerals 33 and 34 denote cover plates which are located at the inner sides, namely, the opposite sides of each of the side plats 10, 11 are formed with the flanges of the side plates in substantially a box-like shape. The cover plates have circular holes 33 $a$, 34 $a$ through the center of the plate and have each diameter smaller than the outer diameter of the flanges 27 and 28 and slightly larger than the outer diameter of the axial surface $a$ of the notched portion 30. The cover plates are assembled in a manner that the inner periphery of each circular hole is located facing the axial face $a$ and closely to the radial face $b$ of the notched portions 30, respectively.

The cover plates 33 and 34 are insertibly fixed to bent ends of side plates 10 and 11, at the same time the connecting rods 23 are fixed to connect the two side plates. The cover plates 33 and 34 are mounted to the corresponding side plates 10 and 11 respectively in a manner that the body of the spool 12 is inserted into the cover plates through the circular holes 33a and 34a fixing the disc plate 31 to the flange 27 of the spool 12, and the disc plate 31 is fixedly mounted to the flange.

Incidentally, the abovementioned construction may not be defined in a way that the outer periphery of one flange of the spool 12 is substituted for the periphery of the disc plate 31; however, this has the advantage that the fishing reel in accordance with the invention becomes easy and efficient in construction. In addition, besides the outer periphery of the flange being constituted with the disc plate 31 as the above mentioned, it is preferred that one flange 27 is formed of a separate member and fixed to the spool by means of fixing means, such as a screw bolt after fabricated into the reel. In addition, the reference numeral 35 in FIGS. 1 and 2 denotes a leg member screwably attached at both ends of the root thereof to cover plates 33 and 34 for fitting the reel to a fishing rod.

As is clearly understood, when an angle turns the handle 13 by hand to allow the spool 12 to rotate for winding up a fishing line thereon, the line may occasionally get over the flange 27 or 28 of the spool 12 for one cause or another to result in its entering into a gap between each axial face a of the abovementioned notched portions 30, 30 and the inner peripheral surface of circular hole 33a or 34a of each cover plate 33 or 34. In this case, the fishing line entering into the gap touches the radial face b to be kept from further entering across the face. Thus the line is completely prevented from entering into the space between an outer side of the spool 12 and an inner side of the side plate 10 or 11 respectively.

Additionally, the fishing line intercepted by the radial face b can be easily restored to the body of the spool.

While an embodiment of the invention has been described, the invention is not limited to the described embodiment and it is to be understood that changes and variations may be made without departing from the spirit or scope of the following claims.

What is claimed is:
1. A fishing reel comprising:
a. two opposite side plates which have bearings at the center thereof respectively and are fixed together with a plurality of tie rods, said side plates having a given spaced interval therebetween, at least one of said plates being provided with a gear-housing having a drag mechanism therein;
b. a spool shaft which is rotatably supported at both ends thereof with said bearings of the side plates, respectively;
c. a spool which is fixed to said spool shaft so as to be rotatable therewith between said side plates, said spool having at both axial ends thereof disc-like shaped flanges opposite to each other, said flanges being provided at an inner side of the outer periphery thereof with an annular notched portion respectively, said notched portion being formed of two faces which extend axially and radially with respect to said spool, respectively;
d. cover plates which are provided at the inside of said side plates, at least one of which cover plates has the gear-housing, said cover plates having at the center thereof a circular hole, respectively, said hole having a diameter smaller than the outer diameter of a corresponding one of the flanges, the inner periphery of said hole facing and spaced apart from the axial face of said notched portion and close to the radial face of the notched portion, wherein at least one of the flanges of said spool is formed of a separate member so that the spool may be inserted at one end thereof through the hole of one of said cover plates, said member being fixed to the spool after the one cover plate is assembled; and
e. a handle attached to one of said side plates and said spool shaft, said handle being turnable in association with said spool shaft so that the spool may be rotated.

2. A fishing reel comprising:
a. two opposite side plates which have bearings at the center thereof respectively and are fixed together with a plurality of tie rods, said side plates having a given spaced interval therebetween, at least one of said plates being provided with a gear-housing having a drag mechanism therein;
b. a spool shaft which is rotatably supported at both ends thereof with said bearings of the side plates, respectively;
c. a spool which is fixed to said spool shaft so as to be rotatable therewith between said side plates, said spool having at both axial ends thereof disc-like shaped flanges opposite to each other, said flanges being provided at an inner side of the outer periphery thereof with an annular notched portion respectively, said notched portion being formed of two faces which extend axially and radially with respect to said spool, respectively, wherein a peripheral end portion at the axially outer side of at least one of said flanges is formed of a disc-like shaped plate having at the center thereof a round hole larger in diameter than the spool shaft, said disc-like shaped plate being fixed with fixing means;
d. cover plates which are provided at the inside of said side plates, at least one of which cover plates has the gear-housing, said cover plates having at the center thereof a circular hole, respectively, said hole having a diameter smaller than the outer diameter of a corresponding one of the flanges, the inner periphery of said hole facing and spaced apart from the axial face of said notched portion and close to the radial face of the notched portion; and
e. a handle attached to one of said side plates and said spool shaft, said handle being turnable in association with said spool shaft so that the spool may be rotated.

* * * * *